United States Patent
Li et al.

(10) Patent No.: US 9,686,036 B2
(45) Date of Patent: Jun. 20, 2017

(54) METHOD, APPARATUS AND SYSTEM FOR TRANSMITTING UPSTREAM BURST DATA IN PON SYSTEM

(75) Inventors: Jing Li, Shenzhen (CN); Dongyu Geng, Shenzhen (CN); Dongning Feng, Shenzhen (CN); Raymond W. K. Leung, Shenzhen (CN); Frank Effenberger, Freehold, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 464 days.

(21) Appl. No.: 12/914,857

(22) Filed: Oct. 28, 2010

(65) Prior Publication Data

US 2011/0044699 A1 Feb. 24, 2011

Related U.S. Application Data

(63) Continuation of application No. PCT/CN2009/070939, filed on Mar. 23, 2009.

(30) Foreign Application Priority Data

Apr. 28, 2008 (CN) .......................... 2008 1 0066881

(51) Int. Cl.
| | |
|---|---|
| *H04B 10/50* | (2013.01) |
| *H04J 3/16* | (2006.01) |
| *H04Q 11/00* | (2006.01) |
| *H04J 3/06* | (2006.01) |
| *H04L 1/00* | (2006.01) |

(52) U.S. Cl.
CPC ........ *H04J 3/1694* (2013.01); *H04Q 11/0066* (2013.01); *H04Q 11/0067* (2013.01); *H04J 3/0605* (2013.01); *H04L 1/0041* (2013.01); *H04Q 2011/0064* (2013.01); *H04Q 2011/0079* (2013.01)

(58) Field of Classification Search
USPC ..................................................... 398/63, 67
See application file for complete search history.

(56) References Cited

U.S. PATENT DOCUMENTS 4,352,183 A * 9/1982 Davis et al. .................. 714/749
7,613,887 B1 * 11/2009 Wong et al. .................. 711/154
(Continued)

FOREIGN PATENT DOCUMENTS

CN 1453944 A 11/2003
CN 101039159 A 9/2007
(Continued)

OTHER PUBLICATIONS

Rich Taborek, "IEEE 802.3 HSSG Gigabit Ethernet", Mar. 1996.*
Effenberger et al., "FEC Synchronization and Framing", P802.3av, Jan. 2007.*
International Search Report dated Jul. 2, 2009 in connection with International Patent Application No. PCT/CN2009/070939.
(Continued)

*Primary Examiner* — Shi K Li

(57) ABSTRACT

A method, an apparatus and a system for transmitting upstream burst data in a passive optical network system. Delimitation of end of upstream burst data is realized in the method. The method includes: transmitting a sync pattern sequence and a burst delimiter after turning on a laser; transmitting data to be sent; and transmitting an end-of-burst delimiter after the transmitting of data to be sent is finished. A method for receiving upstream burst data and a related apparatus and system are also provided in the embodiments of the invention.

16 Claims, 9 Drawing Sheets

(56) References Cited

U.S. PATENT DOCUMENTS

| | | |
|---|---|---|
| 7,630,639 B2 * | 12/2009 | Kramer et al. ............. 398/72 |
| 2002/0080444 A1 | 6/2002 | Phillips et al. |
| 2002/0171895 A1 * | 11/2002 | Chang ..................... 359/168 |
| 2003/0137975 A1 | 7/2003 | Song et al. |
| 2005/0041682 A1 | 2/2005 | Kramer |
| 2005/0169302 A1 * | 8/2005 | Lee et al. ................. 370/465 |
| 2007/0242676 A1 | 10/2007 | Fridman |
| 2007/0269212 A1 * | 11/2007 | Remein et al. ............. 398/63 |
| 2008/0187313 A1 * | 8/2008 | Farmer et al. ............. 398/66 |
| 2009/0116472 A1 * | 5/2009 | Chang et al. ............. 370/350 |
| 2012/0224853 A1 | 9/2012 | Geng et al. |

FOREIGN PATENT DOCUMENTS

| | | |
|---|---|---|
| JP | 2004266524 A | 9/2004 |
| JP | 2008-085970 | 4/2008 |
| KR | 20090132523 A | 12/2009 |
| WO | WO 2007/104230 A1 | 9/2007 |

OTHER PUBLICATIONS

Written Opinion of the International Searching Authority dated Jul. 2, 2009 in connection with International Patent Application No. PCT/CN2009/070939.

Translation of Office Action dated Oct. 14, 2010 in connection with Korean Patent Application No. 10-2009-0036602.

Translation of Office Action dated Jan. 29, 2010 in connection with Chinese Patent Application No. 200810066881.1.

"Changes to ANSI/IEEE Std. IEEE 802.3ay, Clause 1", Mar. 28, 2008, 150 pages.

"Gigabit-capable Passive Optical Networks (GPON): Physical Media Dependent (PMD) layer specification", G.984.2, ITU-T Standard In Force, International Telecommunication Union, Mar. 2003, 35 pages.

Costes, ML, "Unique Word and Ending Word Detection for Synchronization and Burst Limitation", www.ip.com, Sep. 1, 1985, 4 pages.

Supplementary European Search Report dated Jun. 27, 2011 in connection with European Patent Application No. EP 09 73 7651.

* cited by examiner

METHOD, APPARATUS AND SYSTEM FOR TRANSMITTING UPSTREAM BURST DATA IN PON SYSTEM

CROSS-REFERENCE TO RELATED APPLICATIONS

This application is a continuation of International Application No. PCT/CN2009/070939, filed on Mar. 23, 2009, which claims priority to Chinese Patent Application No. 200810066881.1, filed on Apr. 28, 2008, both of which are hereby incorporated by reference in their entireties.

TECHNICAL FIELD

The present invention relates to passive optical network technology, and in particular, to a method, an apparatus and a system for transmitting upstream burst data in a PON system.

BACKGROUND

As an ideal physical platform for accessing multiple services such as voice, data and video through a single platform, the Passive Optical Network (PON) has become one of the leading competitors in the filed of optical access technology due to its easy maintenance, high bandwidth and low costs. The PON is a Point-to-Multipoint (P2MP) optical access technique. A PON consists of an Optical Line Terminal (OLT), an Optical Network Unit (ONU) and an Optical Distribution Network (ODN). The PON takes advantage of the splitter/coupler in the ODN, therefore the PON no longer needs elements with amplifying and relaying functions. Due to its P2MP topology, the PON has to use a P2MP multiple access protocol so that the OLT and the optical fiber may be shared by the ONUs. According to carried contents, PONs may be classified into many categories, among which the Ethernet Passive Optical Network (EPON) is a widely used one with good performances.

In PON systems, downstream refers to the direction in which data is transmitted from the OLT to the ONU, and upstream refers to the direction from the ONU to the OLT. A widely used transmission method in PON is to broadcast using Time Division Multiplexing (TDM) for downstream and to access using Time Division Multiple Access (TDMA) for upstream. Upstream transmission in PON systems is based on burst mode, and data from multiple ONUs is transmitted to an OLT. The OLT has to delimit data from respective ONUs in burst mode, so that the received data from respective ONUs may be distinguished. In the prior art, the OLT authorizes an transmitting time slot for each ONU, based on which the MAC layer of the OLT knows the starting time and ending time of burst data from each ONU. Therefore, by adding an interface between the MAC layer and the physical layer and using a Management Data Input/Output (MDIO) register, the MAC layer of the OLT may inform the physical layer of the OLT of when data received from an ONU ends. Upon knowing the ending point of the data, the physical layer of the OLT starts a burst delimiter search, and matches on data from the next ONU. If the matching succeeds, the OLT knows the starting point of the ONU data, and begins to receive the data from the ONU. However, in the prior art, the MDIO register has to communicate with an upper layer application of the OLT. Therefore, an interface between the MDIO register and the upper layer of the OLT has to be added, which breaks down functional independence of the MDIO register and changes the interface between the MAC layer and the physical layer. Such a solution is complicated.

SUMMARY

Embodiments of the invention provide a method for transmitting upstream burst data in a PON system, with which delimitation of end of upstream burst data may be realized without adding an interface between the physical layer and an upper layer application.

The method includes: transmitting a sync pattern sequence and a burst delimiter after turning on a laser; transmitting data to be sent; and transmitting an end-of-burst delimiter after the transmitting of data to be sent is finished.

An embodiment of the invention further provides another method for transmitting upstream burst data in a PON system. The method includes: turning on a laser; transmitting a sync pattern sequence and a burst delimiter; transmitting data to be sent; starting turning off the laser after the transmitting of data to be sent is finished; and transmitting an all-zero binary sequence with a particular length after starting turning off the laser.

An embodiment of the invention further provides a method for receiving upstream burst data in a PON system. The method includes: starting receiving data; performing burst delimiter matching on the received data, performing matching on the received data with a length of a burst delimiter; if the burst delimiter matching succeeds, performing end-of-burst delimiter matching, and if the end-of-burst delimiter matching succeeds, burst data receiving is determined to be finished.

An embodiment of the invention further provides an ONU transmitting end apparatus, including: a data detecting module, adapted to detect data to be sent, instruct to turn on a laser when the data to be sent is detected; a sync pattern sequence transmitting module, adapted to transmit a sync pattern sequence after the laser is turned on; a burst delimiter transmitting module, adapted to transmit a burst delimiter after the laser is turned on; an end-of-burst delimiter transmitting module, adapted to transmit an end-of-burst delimiter; and a transmitting module, adapted to transmit the data to be sent to an OLT receiving end.

Furthermore, another ONU transmitting end apparatus is provided, including: a data detecting module, adapted to detect data to be sent, instruct to turn on a laser when the data to be sent is detected, and instruct to turn off the laser when end of the data to be sent is detected; a sync pattern sequence transmitting module, adapted to transmit a sync pattern sequence after the laser is turned on; a burst delimiter transmitting module, adapted to transmit a burst delimiter after the laser is turned on; an additional sequence transmitting module, adapted to transmit an all-zero binary sequence with a particular length after the laser starts being turned off; and a transmitting module, adapted to transmit the data to be sent to an OLT receiving end.

An embodiment of the invention further provides an OLT receiving end apparatus, including: a data receiving module, adapted to receive and shift data; a burst delimiter matching module, adapted to perform matching of a burst delimiter on data of the data receiving module; and an end-of-burst delimiter matching module, adapted to perform matching of an end-of-burst delimiter on the data of the data receiving module.

An embodiment of the invention provides a PON communication system which includes an ONU transmitting end and an OLT receiving end.

The ONU transmitting end includes: a data detecting module, adapted to detect data to be sent, instruct to turn on a laser when the data to be sent is detected; a sync pattern sequence transmitting module, adapted to transmit a sync pattern sequence after the laser is turned on; a burst delimiter transmitting module, adapted to transmit a burst delimiter after the laser is turned on; an end-of-burst delimiter transmitting module, adapted to transmit an end-of-burst delimiter; and a transmitting module, adapted to transmit the data to be sent to the OLT receiving end.

The OLT receiving end includes: a data receiving module, adapted to receive and shift data; a burst delimiter matching module, adapted to perform matching of a burst delimiter on data of the data receiving module; and an end-of-burst delimiter matching module, adapted to perform matching of an end-of-burst delimiter on the data of the data receiving module.

The methods and the apparatus provided by the embodiments of the invention realize delimitation of burst data by adding an end-of-burst delimiter after the burst data. The receiving end delimits the burst data by matching of the added end-of-burst delimiter. Such a solution does not need to add an interface between the physical layer and an upper layer application, does not need to break down functional independence of the MDIO register, and readily realizes delimitation of burst data at the physical layer. Complexity of the solution is low.

DETAILED DESCRIPTION

Embodiments of the invention will be described in conjunction with an EPON system. Delimitation of end of burst data is realized by adding an End-Of-Burst delimiter (EOB) at the end of each upstream burst data.

Figure 1:
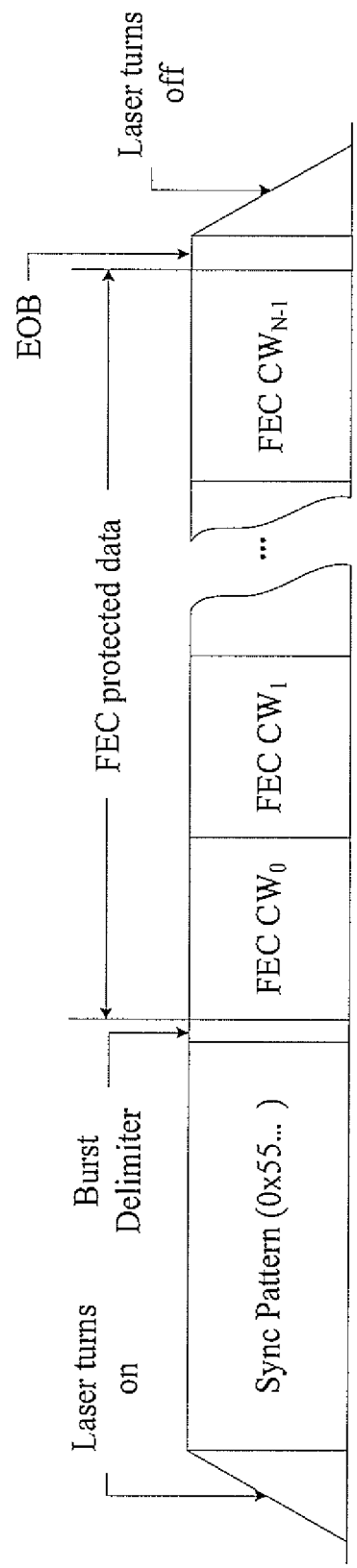
FIG. 1 is a structural diagram of upstream data burst according to an embodiment of the invention.

Referring to FIG. 1, a structural diagram of upstream data burst according to an embodiment of the invention is illustrated. The structure of upstream data burst consists of a Sync Pattern sequence (SP), a Burst Delimiter (BD), Forward-Error-Correction (FEC) protected data and an end-of-burst delimiter. The sync pattern and the burst delimiter are not protected by FEC encoding. FEC code words, i.e. FEC protected data, are after the burst delimiter. Indicating start of data part protected by FEC in a burst, the burst delimiter is not protected by FEC. Particularly, the unit of EOB format may be the block defined in 10 G EPON (block, 66 bits each). The length of the EOB is preferred as the length of two blocks, and a corresponding binary sequence is an all-zero binary sequence or a binary sequence with alternating zeroes and ones, with a length of 132 bits, e.g. a 000000 . . . sequence, or a 101010 . . . sequence, or a 010101 . . . sequence.

Figure 2:
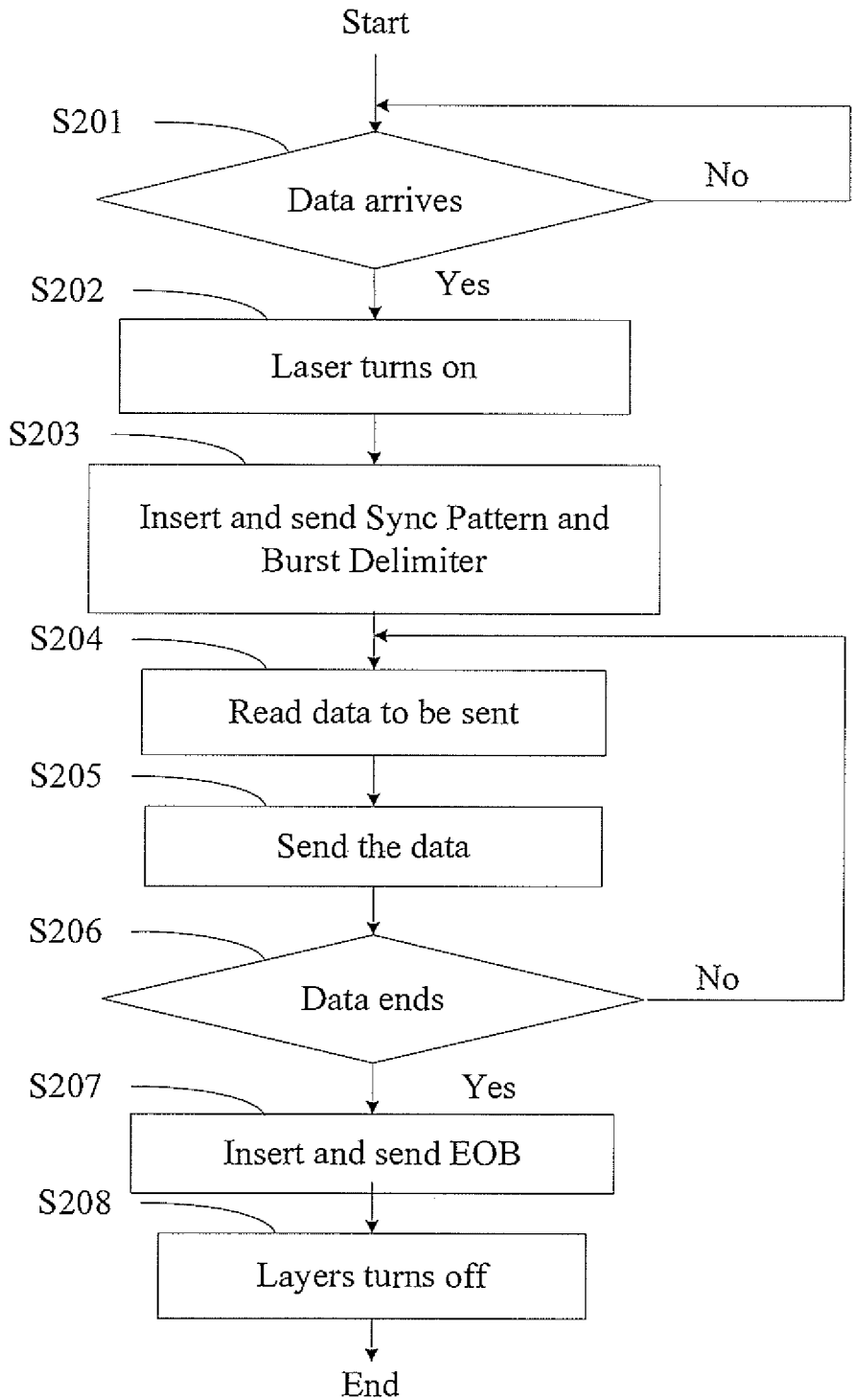
FIG. 2 is a flow chart of a burst transmission of an ONU transmitting end according to an embodiment of the invention.

Referring to FIG. 2, a flow chart of a burst data transmission of an ONU transmitting end according to an embodiment of the invention is illustrated.

S201: It is detected whether there is data to be sent, and if there is no data to be sent, the detecting continues; if it is detected that there is an Ethernet data frame to be sent, S202 is performed to turn on a laser.

S203: After the laser is turned on, a sync pattern and a burst delimiter are inserted before the data to be sent and sent. In this embodiment, the sync pattern is 0x555 . . . , and the burst delimiter is 66 bits in length, which is the length of one block.

S204: Read the data to be sent. The data to be sent is obtained.

S205: The data is sent.

S206: It is determined whether the data transmitting is finished, and if the data transmitting is not finished, reading of the data to be sent continues; if the data transmitting is finished, S207 is performed.

S207: An EOB is inserted and the EOB is sent. The unit of the inserted EOB format may be the block defined in 10 G EPON (block, 66 bits each). The length of the EOB is preferred as the length of two blocks, and a corresponding binary sequence is an all-zero binary sequence or a binary sequence with alternating zeroes and ones with a length of 132 bits, e.g. a 000000 . . . sequence, or a 101010 . . . sequence, or a 010101 . . . sequence.

S208: The laser is turned off after the transmitting of the EOB is finished.

The on and off of the laser are controlled by a particular state of a First In First Out (FIFO) queue in a data detector of the ONU transmitting end.

Figure 3:
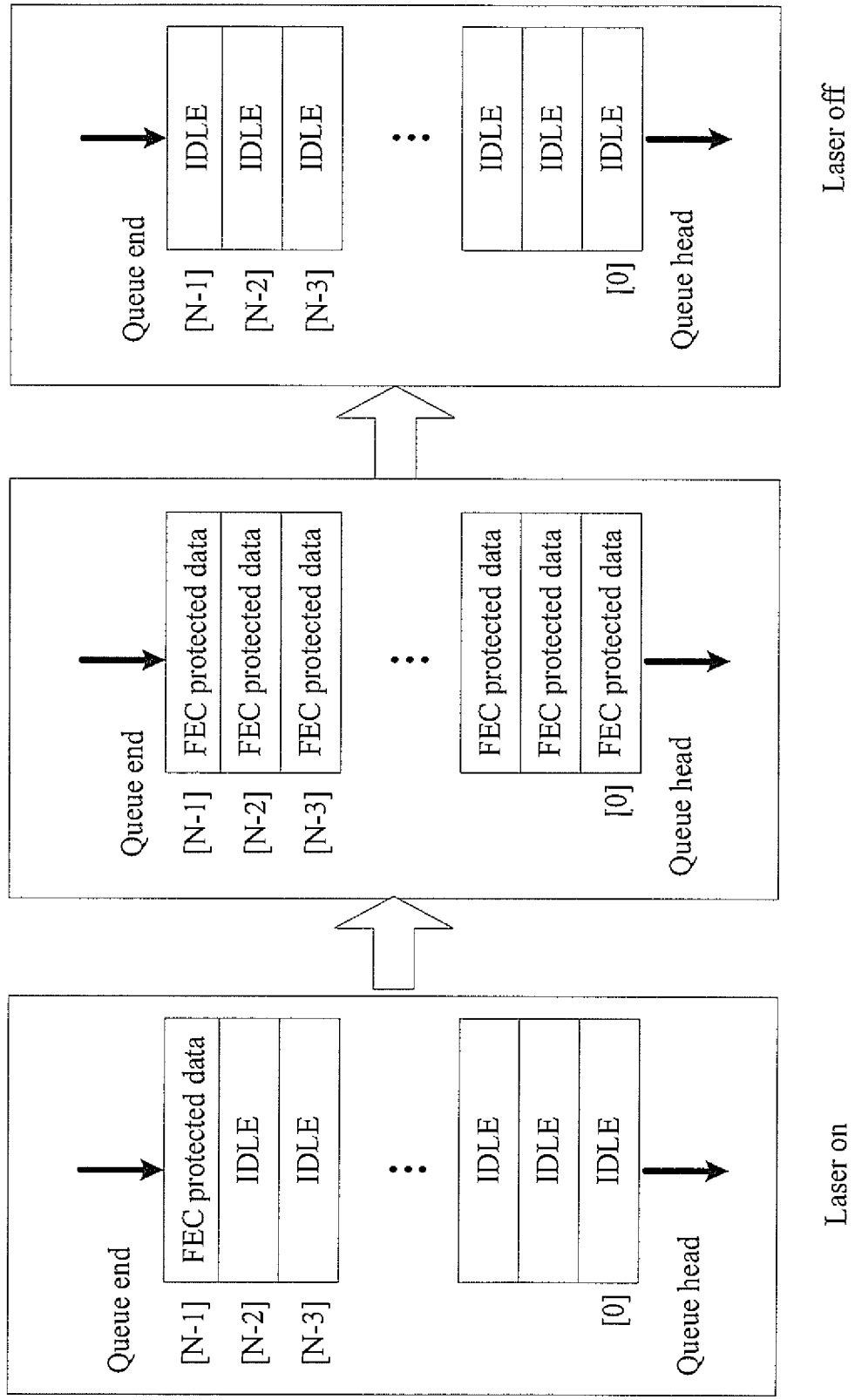
FIG. 3 illustrates FIFO state change of a burst data detector of an ONU transmitting end according to an embodiment of the invention.

FIG. 3 illustrates FIFO state change of the data detector of the ONU transmitting end. When arrival of the data to be sent is detected by the data detector of the ONU transmitting end, i.e. when the data protected by FEC encoding appears at the end of the FIFO queue, S202 is performed, i.e. the laser is to be turned on. In this embodiment, before the data to be sent arrives, the FIFO queue is all control blocks, particularly, the control blocks are control identifiers IDLE. A sync pattern (0x555 . . . ) and a burst delimiter (66 bits in length, the length of one block in 10 G EPON) are inserted before the data to be sent, and the sync pattern and the burst delimiter are sent, then the data to be sent is sent. When all data is sent, the FIFO queue of the data detector is all filled with control blocks. If it is detected that the FIFO queue of the data detector is all filled with control blocks, data transmitting is determined to be finished. Then S206 is performed, the EOB is inserted and sent. When the transmitting of EOB is finished, the laser is instructed to be turned off. In particular, all control blocks of the FIFO queue may be set to be all-zero blocks when or after the turning off is started.

Figure 4:
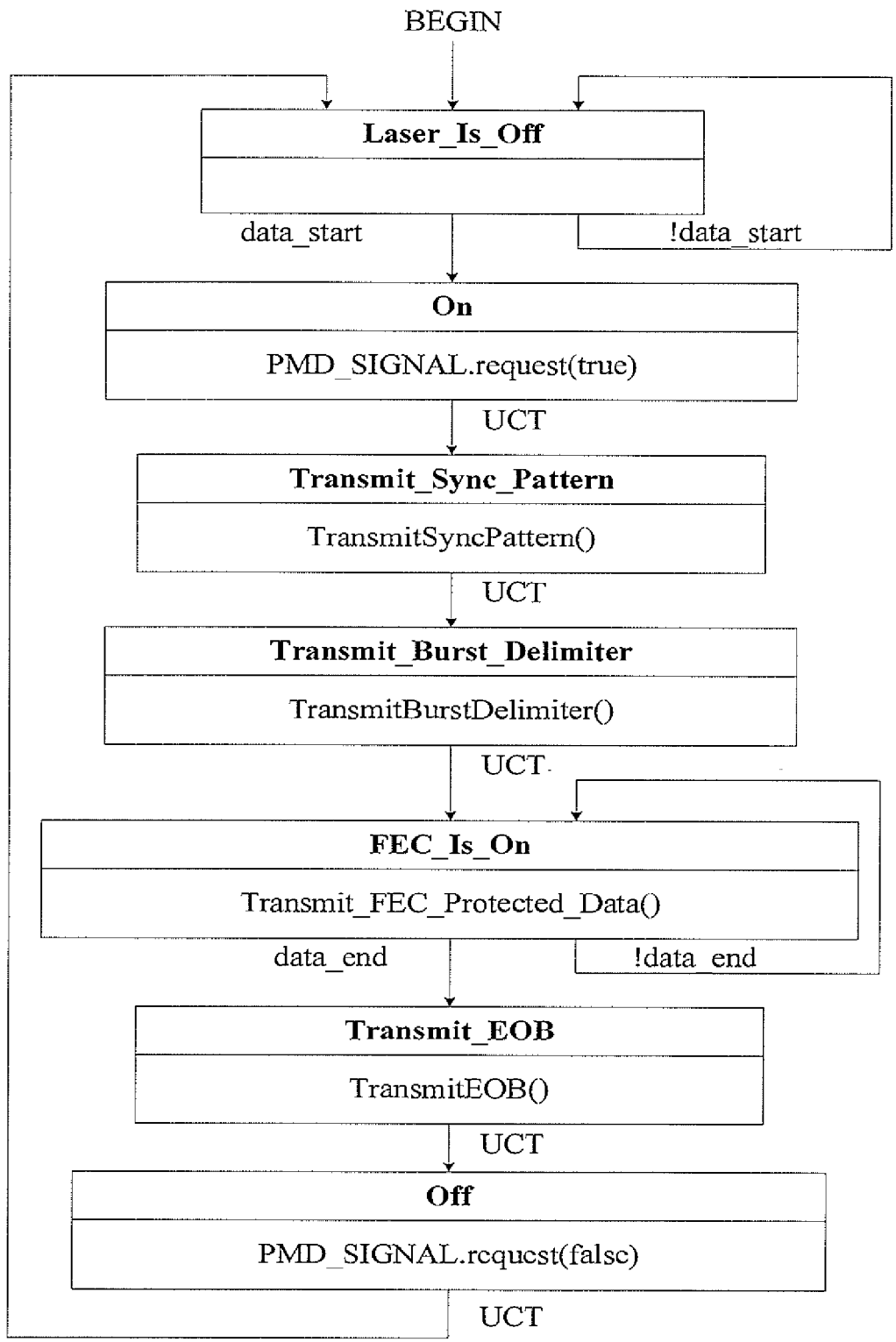
FIG. 4 illustrates burst transmission state transition of an ONU transmitting end according to an embodiment of the invention.

FIG. 4 illustrates burst transmission state transition of the ONU transmitting end. The initial state of the ONU is "Laser_Is_Off". A Boolean variable data_start indicates whether the data to be sent arrives. When the value of the Boolean variable data_start is "false", it is determined that arrival of the data to be sent is not detected, and the laser remains off; once the value of the Boolean variable data_start is "true", it is determined that the data to be sent arrives, the laser is to be turned on and the state is changed to "on"; then the state of transmitting the sync pattern and the state of transmitting the burst delimiter are entered sequentially, which are the states "Transmit_Sync_Pattern" and "Transmit_Burst_Delimiter"; the state of transmitting FEC protected data, "FEC_Is_On", is entered after the transmitting of the sync pattern and the transmitting of the burst delimiter are finished; when the value of a Boolean variable data_end is "false", it is determined that current burst data transmission is not finished, and the state of transmitting burst data, "FEC_Is_On", remains; once the transmitting of burst data is finished, i.e. the value of the Boolean variable data_end is "true", the state of transmitting the EOB, "Transmit_EOB", is entered; then the laser is instructed to be turned off, and the state of laser being turned off, "Laser_Is_Off", is back, awaiting next burst data. This process repeats, and multiple continuous burst data may be transmitted to the OLT sequentially.

By adding an EOB at the end of each upstream burst data, the above solution realizes the delimitation of end of the burst data. In particular, as a complement, the laser may start being turned off when transmitting of the FEC protected data (a.k.a. FEC data) is finished, i.e. the laser starts being turned off when it is detected that there are all control blocks in the FIFO sequence. A period of time is needed for the laser to be turned off, during which the laser remains transmitting data. However, due to physical characteristics of the laser, when the laser is instructed to be turned off, transmission power of the laser eventually drops off until the laser is finally off. Therefore, after starting turning off the laser, an all-zero binary sequence may be inserted and transmitted. Without being part of the burst data, the all-zero binary sequence goes right after the burst data, therefore the all-zero binary sequence may be used as an EOB of the foregoing burst data. The length of the all-zero binary sequence may be a natural number times 66 bits. 132 bits is preferred.

Figure 5:
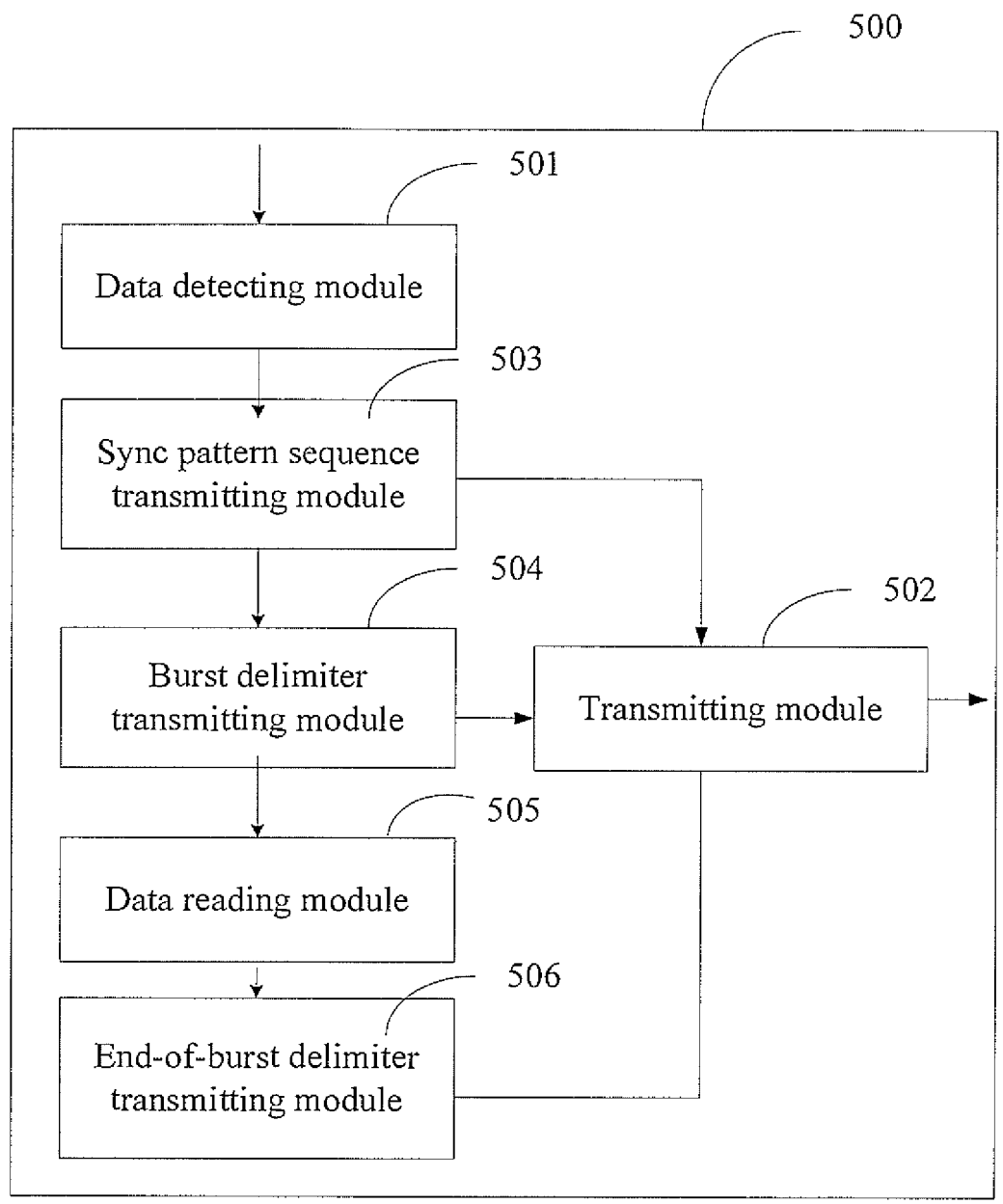
FIG. 5 is a structural block diagram of an ONU transmitting end according to an embodiment of the invention.

Referring to FIG. 5, a structural block diagram of an ONU transmitting end is illustrated. The ONU transmitting end 500 of ONU includes:

a data detecting module 501, adapted to detect data to be sent, instruct to turn on the laser when arrival of the data to be sent is detected, and in particular, adapted to detect whether there is the data to be sent, instruct to turn on the laser when detecting that FEC protected data to be sent appears at the end of the FIFO queue, which indicates that the data to be sent arrives, and instruct to turn off the laser when detecting that the data to be sent ends and transmitting of the end-of-burst delimiter is finished;

a sync pattern sequence transmitting module 503, adapted to transmit the sync pattern after the laser is turned on;

a burst delimiter transmitting module 504, adapted to transmit the burst delimiter after the laser is turned on;

a data reading module 505, adapted to read the data to be sent from a transmitting buffer, and transmit through a transmitting module 502;

an end-of-burst delimiter transmitting module 506, adapted to transmit an end-of-burst delimiter; and the transmitting module 502, adapted to transmit the data to be sent to an OLT receiving end.

After the transmitting of the EOB is finished, the laser is turned off, and the burst ends.

Furthermore, the ONU transmitting end includes a control identifier modifying module (not shown in the figure), adapted to set the control blocks in the FIFO queue to be all-zero blocks before the laser is turned off after the transmitting of the data to be sent is finished.

Another embodiment of an ONU transmitting end is provided by the invention, different from the above embodiment as follows:

The data detecting module is further adapted to detect the data to be sent, instruct to turn on the laser when arrival of the data to be sent out is detected, and instruct to turn off the laser when end of the transmitting of the data to be sent is detected; this embodiment further includes an additional sequence transmitting module (not shown in the figure) adapted to transmit an all-zero binary sequence with a particular length after the laser starts being turned off, the all-zero binary sequence being sent out by the transmitting module 502.

Transmitting of burst data by the ONU transmitting end is described above.

The burst data has to be received and processed at an OLT transmitting end.

Figure 6:
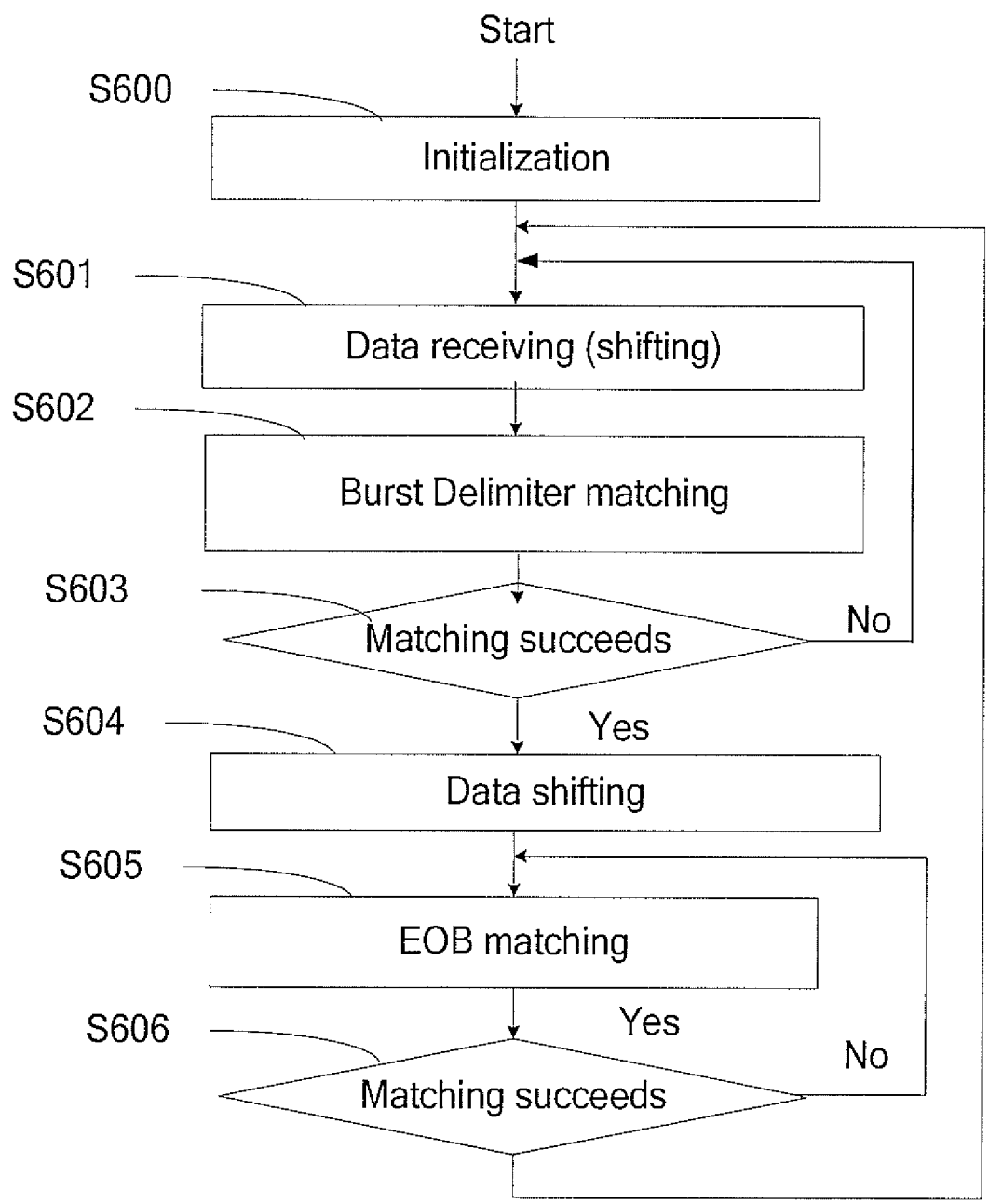
FIG. 6 is a flow chart of burst data receiving according to an embodiment of the invention.

Referring to FIG. 6, a flow chart of burst data receiving according to an embodiment of the invention is illustrated.

S600: The OLT is started and initialized.

S601: The data receiving module starts to receive data.

S602: Burst delimiter matching is performed on the received data; the matching is performed on the received data with a length of the burst delimiter (one block).

S603: It is determined whether the matching succeeds, and a Hamming Distance (HD) between the received data and the burst delimiter sequence is calculated. If the HD is less than a predefined threshold T1, the matching is determined to be a success.

If the matching fails, the data receiving module shifts the data by one bit (or, the data may be shifted in groups), the matching continues, and new data is received. If the matching succeeds, S604 is performed.

S604: The data is shifted; the data is shifted in bits, in this embodiment, data is shifted by one bit, in practice, the length of FEC plus a BD may be skipped in first, and shifting may be performed in bits, in blocks, or in groups.

S605: EOB matching is performed on the shifted data in the unit of two blocks;

S606: It is determined whether the EOB matching succeeds, a Hamming Distance (HD) between the received data and the EOB sequence is calculated. If the HD is less than a predefined threshold T2, the matching is determined to be a success. If the matching fails, the data is shifted by one block (66 bits), the matching continues, and new data is received; if the EOB search matching succeeds, it is determined that the current burst ends, and S601 is performed, the next burst is to be received and delimited.

Further, matching of an all-zero sequence with a particular length is started after the matching of the burst delimiter is finished, which is called additional matching. The additional matching may be performed at the same time with the EOB matching, and if the additional matching succeeds, it is determined that the EOB matching succeeds. The length of the all-zero sequence may be a natural number times the length of one block. An all-zero sequence with a length of two blocks is preferred.

Figure 7:
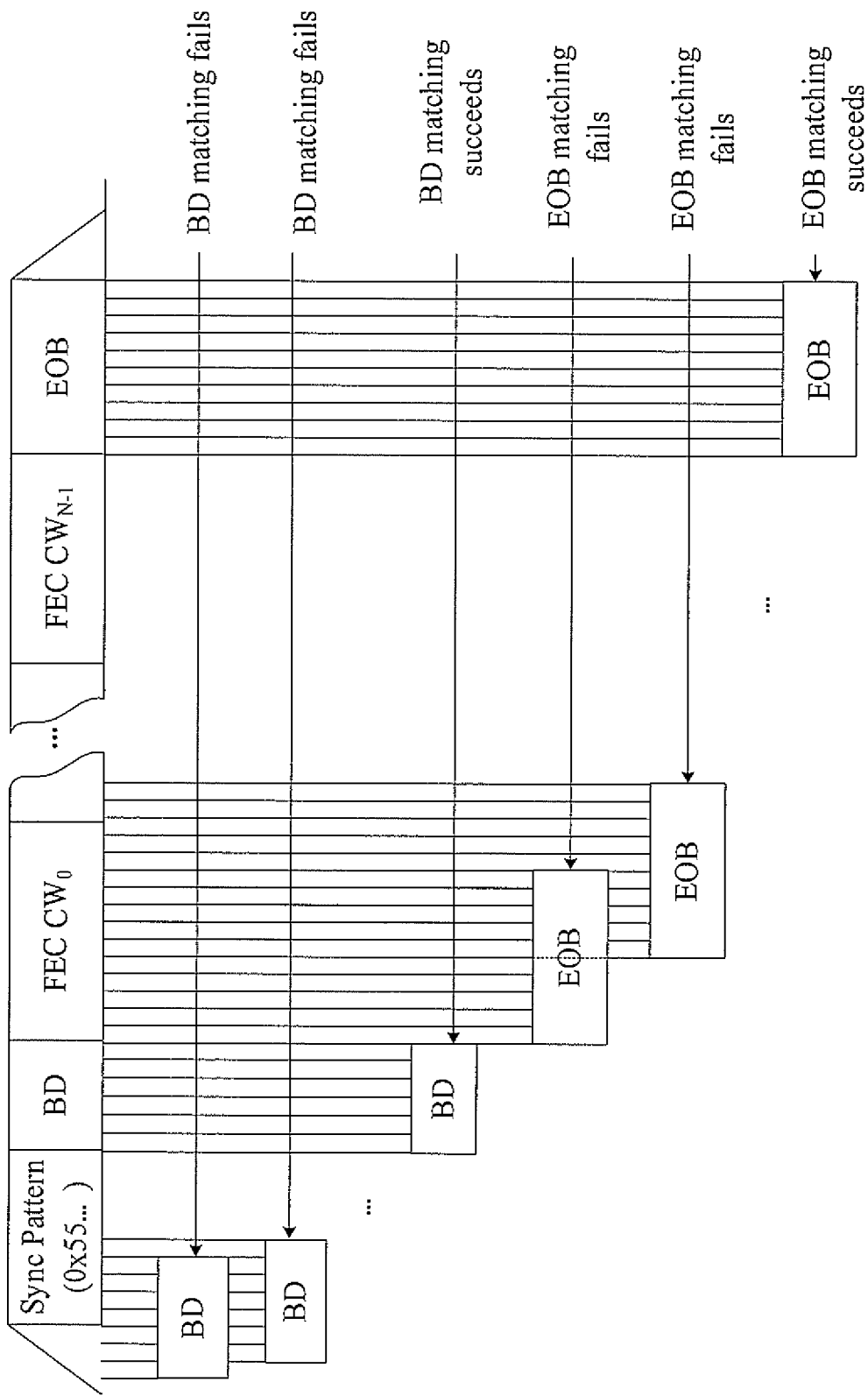
FIG. 7 illustrates a matching process in burst data receiving according to an embodiment of the invention.

FIG. 7 illustrates a matching process in burst data receiving according to an embodiment of the invention, which further describes the matching process in S603 and S606. Matching is performed between the received data and the burst delimiter, i.e. a Hamming Distance (HD) between the received data and the burst delimiter sequence is calculated. If the HD is less than a predefined threshold T1, the matching is determined to be a success; if the matching fails, data is shifted in bits, and the matching continues until the matching succeeds. If the burst delimiter matching succeeds, the starting point of the burst may be determined, and the EOB matching process is started; because the length of the EOB is preferred as the length of two blocks in this embodiment, and if the burst delimiter matching succeeds, synchronization in the block may be realized at the same time, therefore in the process of EOB matching, it is preferred to perform shifting and matching in blocks (66 bits); a Hamming Distance (HD) between the received data and the EOB sequence is calculated, if the HD is less than a predefined threshold T2, the matching is determined to be a success; If the EOB matching succeeds, the ending point of the burst may be determined, then the burst delimiter matching is started again, the starting point of the next burst is detected, this process repeats, and the starting and ending point of each burst arrived at the OLT may be detected effectively.

Figure 8:
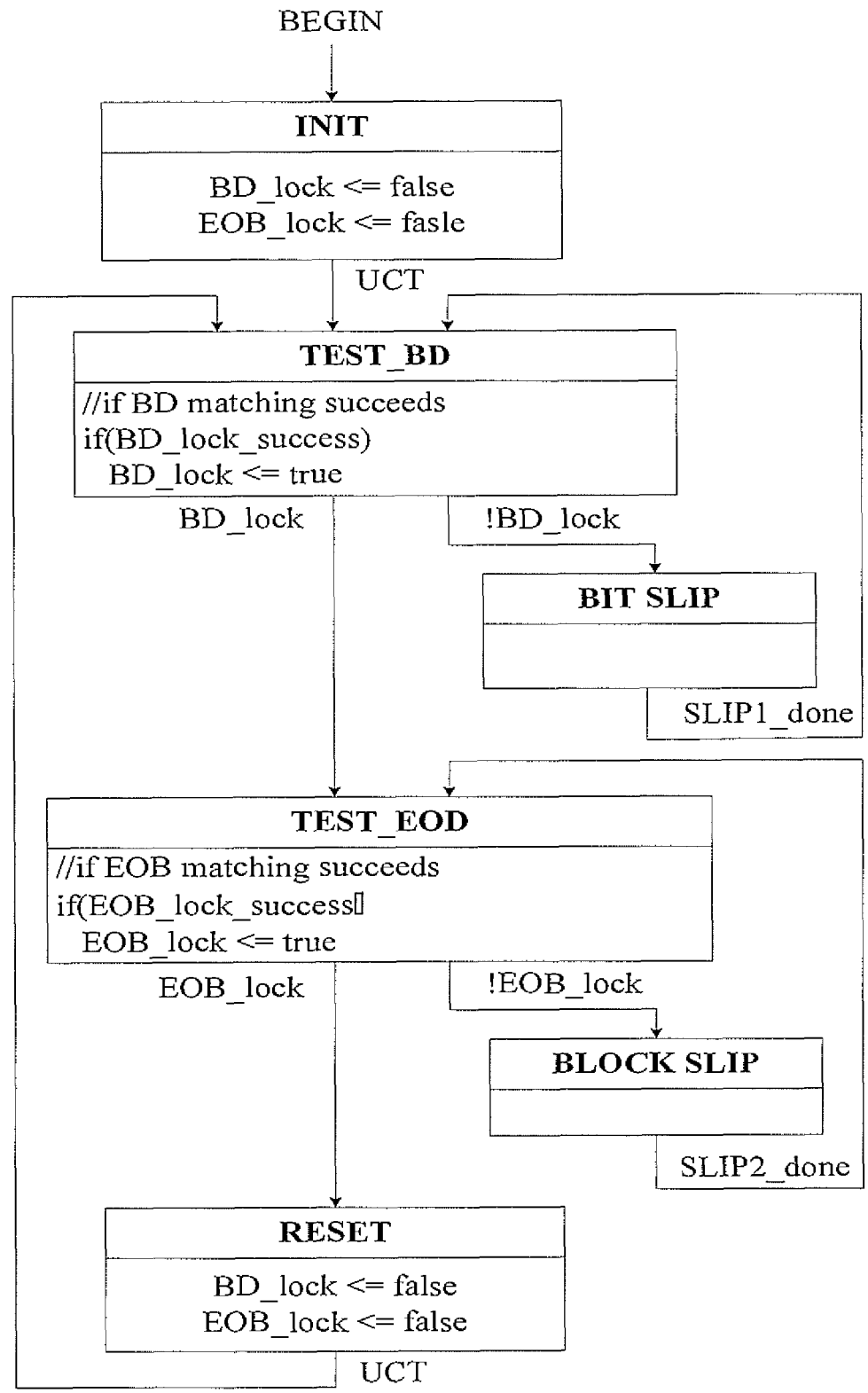
FIG. 8 illustrates state transition of burst delimitation of an OLT receiving end according to an embodiment of the invention.

FIG. 8 illustrates state transition of burst delimitation of an OLT receiving end according to an embodiment of the invention. At first, the OLT transmitting end enters the initial state "INIT", and Boolean variables BD_lock and EOB_lock are initialized to be "false", which indicate the states of burst delimiter and EOB matching respectively, with "true" to indicate a matching success and "false" to indicate a matching fail; burst delimiter matching is stated, and the state "TEST_BD" is entered; if the matching fails, the state "BIT SLIP" is entered, and data is received, or shifted in bits or in groups, and then the matching restarts; this process repeats until the matching succeeds (i.e., the state BD_lock_success turns into true), then the variable BD_lock is set to be "true", and EOB matching is stated and the state of EOB matching, "TEST_EOB", is entered; if the matching fails, the state "BLOCK SLIP" is entered and data is received, or shifted in blocks or shifted in another shifting way, then the matching restarts; this process repeats until the matching succeeds (i.e. the state EOB_lock_success turns into true), then the variable EOB_lock is set to be "true" and the current burst delimiter receiving ends; the state "RESET" is entered and the variable BD_lock and EOB_lock are reset to be "false", a new cycle starts so as to delimit and receive new burst data, this process repeats, therefore delimitation and receiving of all the received burst data may be achieved.

Shifting may be performed in blocks in a particular EOB matching, as described above. Other embodiments of the invention are provided. Shifting may be performed in bits, or, EOB shifting and matching may be performed after data with a particular length is skipped in first. For example, a length of one EFC code word may be skipped in first (In 10 G EPON systems, the length of data part is at least the length of one FEC code word, which is 31 blocks). The matching of the EOB is determined to be a success if a Hamming Distance (HD) between the EOB and the received data meets the following requirements: when the EOB is 000000 . . . , i.e. an all-zero binary sequence, if HD<T2, the matching is determined to be a success; when the EOB is 010101 . . . or 101010 . . . , i.e., an binary sequence with alternating zeroes and ones, and if it is allowed to match 010101 (a binary sequence with alternating zeroes and ones and with 01 as the repetition) to 101010 (a binary sequence with alternating zeroes and ones and with 10 as the repetition), then if HD>132-T2 or HD<T2, the matching is determined to be a success with T2 being the tolerance threshold, otherwise, i.e., if it is not allowed to match 010101 (a binary sequence with alternating zeroes and ones and with 01 as the repetition) to 101010 (a binary sequence with alternating zeroes and ones and with 10 as the repetition), then if HD<T2, the matching is determined to be a success with T2 being the tolerance threshold.

The length and particular value of the EOB may be set according to the actual situation of the system or apparatus in this embodiment. The length of the EOB is preferred as the length of two blocks, and the particular value is preferred as an all-zero binary sequence 000000 . . . or a binary sequence with alternating zeroes and ones (010101 . . . or 101010 . . . ).

When the EOB is a binary sequence with alternating zeroes and ones 010101 . . . or 101010 . . . , if the EOB cannot be matched correctly due to code error brought in by channel transmission, because the sync pattern of the next burst is also 1010101010 . . . , secondary matching protection may be provided. However, bit mis-position may happen due to the way of shifting in block, i.e., if 010101 . . . is used to perform the matching, the actual matched sequence may be 101010 . . . , but as long as the determination criteria uses HD>132-T2 or HD<T2, the success of matching may also be achieved, therefore before matching of a new burst delimiter the former burst ends, and burst delimiter matching starts timely.

When the EOB is an all-zero sequence 000000 . . . , because no data is transmitted between bursts, there are all-zero data in the channel. Similarly, if the EOB cannot be matched correctly due to code error brought in by channel transmission, secondary matching protection may be provided by the all-zero data between bursts. If the all-zero data between burst is not long enough to match the EOB, and the secondary matching may not be achieved, the sync pattern of the next burst may be used. Therefore, besides 00000 . . . , as long as the 010101 . . . or 101010 in the sync pattern matches, the matching is considered a success. Furthermore, because the particular value of EOB is an all-zero binary sequence 000000 . . . , the Physical Medium Dependent (PMD) sublayer of the ONU transmitting end may get into the state off more quickly.

Figure 9:
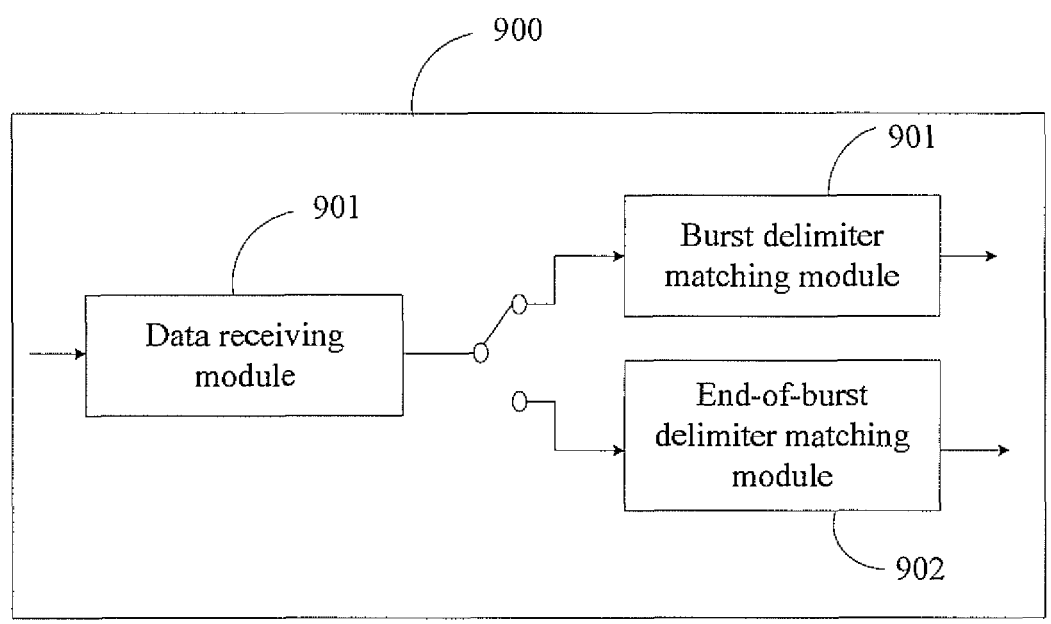
FIG. 9 is a structural block diagram of a transmitting end according to an embodiment of the invention.

Referring to FIG. 9, a structural block diagram of a transmitting end according to an embodiment of the invention is illustrated. The OLT receiving end 900 includes a data receiving module 901, a burst delimiter matching module 902 and an end-of-burst delimiter matching module 903. The data receiving module 901 is adapted to receive and shift data. When the OLT is started and initialized, the data receiving module 901 starts receiving data and an output switch is switched to the burst delimiter matching module 902, inputs the received data to the burst delimiter matching module 902 in the unit of the length of the burst delimiter (one block) to perform burst delimiter synchronizing and matching; a sub-module of the burst delimiter matching module 902, first calculating module calculates a Hamming Distance (HD) between the received data and the burst delimiter sequence, if the HD is less than a predefined threshold T, the matching is determined to be a success; if the matching fails, the data receiving module 901 shifts the data by one bit (or, by one group), transmits the data to the burst delimiter matching module 902 to continue the matching, and receives new data, the process may be repeated. If the matching of the burst delimiter succeeds, it is determined that synchronized receiving of the burst data from an ONU succeeds, then the switch is switched to the end-of-burst matching module 903 so that EOB search matching is started; then the data receiving module 901 transmit the received data to the end-of-burst matching module 902 in the unit of the length of the EOB (two blocks) to perform EOB matching; a sub-module of the end-of-burst delimiter 903, second calculating module, calculates a Hamming Distance (HD) between the received data and the EOB sequence, if the HD is less than a predefined threshold T, the matching is determined to be a success; if the match fails, the data receiving module 901 shifts the data by one block (66 bits), transmits the data to the EOB matching module to continue the matching, and receives new data, the process may be repeated. If the search matching of the EOB match succeeds, it is determined that the burst ends, and the data receiving module 901 switches the output switch again to the burst delimiter matching module 902. The above OLT receiving end 900 also includes an additional sequence matching module (not shown in the figure) adapted to perform matching of an all-zero sequence with a length of a natural number times 66 bits after the matching of the burst delimiter by the burst delimiter match module 902 succeeds.

According to the above description, searching of the next burst delimiter for its synchronization may be started after the data receiving module 901 switches the output switch to the burst delimiter matching module 902 again. Therefore, synchronized receiving and delimitation of each burst data from the ONU may be realized.

As discussed above, matching of the EOB is performed during receiving of burst data by the receiving end. In practice, the receiving end does not identify whether the EOB is inserted to the burst data by the transmitter. However, as to the receiver, the matching of the EOB is treated as a matching of a particular sequence, which may be an all-zero binary sequence 0000000 . . . or a binary sequence with alternating zeroes and ones (010101 . . . or 101010 . . . ), the length of which is preferred as 132 bits. The EOB is just an end-of-burst delimiter to the receiving end. Due to the intervals between adjacent bursts, there are all-zero data in the channel, the data sequence therebetween may also be an end-of-burst identifier to the receiving end. At the receiving end, an EOB is not restricted to the data inserted by the transmitter, but is a particular sequence, which may be inserted by the transmitting end to the burst data, or may be the data between adjacent bursts, or a combination of the two. In addition, the end-of-burst identifier, in practice, may be a combination of data inserted in a former burst, data between bursts and a sync pattern of a latter burst, or a combination of data between bursts and a sync pattern of a latter burst. Therefore, it should be noted that an EOB of burst data is not only data inserted in the burst, but also the kinds of data stated above. During receiving, the matching of EOB is matching of a particular data sequence.

An embodiment of the invention further provides a PON communication system, including the above ONU transmitting end and the above OLT receiving end apparatus.

The ONU transmitting end includes: a data detecting module, adapted to detect data to be sent, instruct to turn on a laser when arrival of the data to be sent is detected; a sync pattern sequence transmitting module, adapted to transmit a sync pattern sequence after the laser is turned on; a burst delimiter transmitting module, adapted to transmit a burst delimiter after the laser is turned on; an end-of-burst delimiter transmitting module, adapted to transmit an end-of-burst delimiter; and a transmitting module, adapted to transmit the data to be sent to the OLT receiving end.

The OLT receiving end includes: a data receiving module, adapted to receive and shift data; a burst delimiter matching module, adapted to perform matching of a burst delimiter on data of the data receiving module; and an end-of-burst delimiter matching module, adapted to perform matching of an end-of-burst delimiter on the data of the data receiving module.

The ONU transmitting end further includes: a control identifier modifying module, adapted to set all control blocks in an FIFO queue of a data detector to all-zero data blocks after the transmitting of the data to be sent is finished and before the laser is turned off.

The OLT receiving end further includes: an additional sequence matching module, adapted to perform matching of an all-zero sequence with a particular length after the matching of the burst delimiter by the burst delimiter matching module succeeds.

The methods and the apparatus provided by the embodiments of the invention realize delimitation of burst data by adding an end-of-burst delimiter after the burst data. The receiving end delimits the burst data by matching of the added end-of-burst delimiter. Such a solution does not need to add an interface between the physical layer and an upper layer application, does not need to break down functional independence of the MDIO register, and readily realizes delimitation of burst data at the physical layer. Complexity of the solution is low.

What is claimed is:

1. A method of transmitting upstream burst data to an Optical Line Terminal (OLT) in a passive optical network system, the method comprising:
    detecting forward-error-correction (FEC) protected data in a first-in-first-out (FIFO) queue;
    transmitting a sync pattern sequence and a burst delimiter after turning on a laser;
    transmitting upstream burst data comprising the FEC protected data to be sent to the OLT; and
    transmitting an end-of-burst delimiter after the transmitting of upstream burst data has been completed, wherein the end-of-burst delimiter enables the OLT to determine the end of the upstream burst data and the end-of-burst delimiter comprises a binary sequence with alternating zeroes and ones that is 66 bits in length.

2. The method according to claim 1, wherein the end-of-burst delimiter is sent after it is detected that a First In First Out queue of a data detector is all filled with control blocks.

3. The method according to claim 1, further comprising: turning off the laser.

4. The method according to claim 3, further comprising setting a control block in a First In First Out queue of a data detector as an all-zero data block while starting turning off the laser or after starting turning off the laser.

5. The method according to claim 1, further comprising: reading the data to be sent after the transmitting of the sync pattern sequence and the burst delimiter.

6. The method according to claim 5, further comprising: determining whether the data transmitting is finished, and if the data transmitting is not finished, reading of the data to be sent continues.

7. The method according to claim 1, further comprising: detecting whether there is data to be sent, and if there is no data to be sent, the detecting continues; if it is detected that there is an Ethernet data frame to be sent, turning on the laser.

8. An Optical Network Unit (ONU), comprising:
    a sync pattern sequence transmitting module configured to transmit a sync pattern sequence after a laser is turned on;
    a burst delimiter transmitting module configured to transmit a burst delimiter after the laser is turned on;
    an end-of-burst delimiter transmitting module configured to transmit an end-of-burst delimiter after the transmitting of upstream burst data has been completed, wherein the end-of-burst delimiter comprises a binary sequence with alternating zeroes and ones—that is 66 bits in length; and a transmitting module configured to transmit the data to be sent to an Optical Line Terminal (OLT).

9. The apparatus according to claim 8, further comprising:
a data detecting module configured to detect data to be sent, and instruct to turn on the laser when the data to be sent is detected.

10. The apparatus according to claim 8, further comprising: a control identifier modifying module configured to set a control block in a First In First Out queue of a data detector as an all-zero data block after the transmitting of the data to be sent is finished and before the laser is turned off.

11. The apparatus according to claim 8, further comprising: a data reading module configured to read the data to be sent from a transmitting buffer.

12. A passive optical network communication system, comprising an Optical Network Unit (ONU) and an Optical Line Terminal (OLT), wherein
the ONU comprises:
a sync pattern sequence transmitting module configured to transmit a sync pattern sequence after the laser is turned on;
a burst delimiter transmitting module configured to transmit a burst delimiter after the laser is turned on;
an end-of-burst delimiter transmitting module configured to inform the OLT of the end of the upstream burst data by transmitting an end-of-burst delimiter, wherein the end-of-burst delimiter comprises a binary sequence with alternating zeroes and ones that is 66 bits in length; and a transmitting module configured to transmit the data to be sent to the OLT receiving end;
the OLT comprises:
a data receiving module configured to receive and shift data;
a burst delimiter matching module configured to perform matching of a burst delimiter on data of the data receiving module; and
an end-of-burst delimiter matching module configured to perform matching of an end-of-burst delimiter on the data of the data receiving module.

13. The system according to claim 12, wherein the ONU further comprises:
a data detecting module configured to detect data to be sent, and instruct to turn on a laser when the data to be sent is detected.

14. The system according to claim 12, wherein the ONU further comprises:
a data reading module configured to read the data to be sent from a transmitting buffer.

15. The system according to claim 12, wherein the ONU further comprises: a control identifier modifying module configured to set a control block in a First In First Out queue of a data detector as an all-zero data block after the transmitting of the data to be sent is finished and before the laser is turned off.

16. The system according to claim 12, wherein the OLT further comprises:
an additional sequence matching module configured to perform matching of an all-zero sequence with a particular length after the matching of the burst delimiter by the burst delimiter matching module succeeds.

* * * * *